United States Patent
Sharma (10) Patent No.: US 12,200,337 B2
(45) Date of Patent: *Jan. 14, 2025

(54) FLEXURE AMPLIFIED PIEZO ACTUATOR FOR FOCUS ADJUSTMENT

(71) Applicant: Waymo LLC, Mountain View, CA (US)

(72) Inventor: Shashank Sharma, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,577

(22) Filed: May 3, 2023

(65) Prior Publication Data

US 2023/0276113 A1 Aug. 31, 2023

Related U.S. Application Data

(63) Continuation of application No. 17/658,041, filed on Apr. 5, 2022, now Pat. No. 11,678,039, which is a (Continued)

(51) Int. Cl.
*H04N 23/54* (2023.01)
*H02N 2/04* (2006.01)

(52) U.S. Cl.
CPC ............. *H04N 23/54* (2023.01); *H02N 2/043* (2013.01)

(58) Field of Classification Search
CPC ............................... H04N 23/54; H02N 2/043
See application file for complete search history.

(56) References Cited

U.S. PATENT DOCUMENTS

| 7,508,117 B2 | 3/2009 | Takeuchi |
| 8,175,449 B2 | 5/2012 | Kubo et al. |

(Continued)

FOREIGN PATENT DOCUMENTS

| CN | 2352976 Y | 12/1999 |
| CN | 102981243 B | 10/2014 |

(Continued)

OTHER PUBLICATIONS

Wei et la., "A compact two-dimensional laser scanner based on piezoelectric actuators," Review of Scientific Instruments, 2015, pp. 013102-1 to 13102-8, vol. 86.
Zhang et al., "The Research on a Novel Linear Stepping Piezoelectric Stacks Actuator," 2015 Symposium on Piezoelectricity, Acoustic Waves, and Device Applications, Oct. 30, 2015-Nov. 2, 2015, China, 4 pages.

*Primary Examiner* — Padma Haliyur
(74) *Attorney, Agent, or Firm* — McDonnell Boehnen Hulbert & Berghoff LLP (57) ABSTRACT

A camera includes a camera focus adjustment device, a lens, and an image sensor coupled to the camera focus adjustment device. The camera focus adjustment device includes a flexure structure. The flexure structure includes an outer framework of structural members continuously interconnected by flexure notch hinges. The flexure structure also includes two inner structural members oriented in parallel and extending from the outer framework of structural members. A gap is between the two inner structural members. The camera focus adjustment device also includes a piezoelectric material within the gap and a pair of wedges within the gap. The pair of wedges is affixed to the piezoelectric material and to one inner structural member of the two inner structural members. Based on temperature-based piezoelectric activity associated with the piezoelectric material, the camera focus adjustment device is operable to move the image sensor relative to the lens.

20 Claims, 9 Drawing Sheets

Related U.S. Application Data continuation of application No. 17/132,667, filed on Dec. 23, 2020, now Pat. No. 11,323,599.

(56) References Cited

U.S. PATENT DOCUMENTS

| | | | |
|---|---|---|---|
| 8,248,497 B2 | 8/2012 | Tanimura et al. | |
| 8,675,114 B2 | 3/2014 | Watanabe et al. | |
| 2005/0140792 A1 | 6/2005 | Hermsen | |
| 2007/0070228 A1 | 3/2007 | Lee | |
| 2013/0194555 A1* | 8/2013 | Davis | H10N 30/08 |
| | | | 216/13 |
| 2014/0092493 A1* | 4/2014 | Topliss | G02B 27/648 |
| | | | 359/824 |
| 2019/0361153 A1 | 11/2019 | Wang et al. | |
| 2020/0228718 A1* | 7/2020 | Chen | H04N 23/55 |
| 2020/0357838 A1 | 11/2020 | Fukuyama et al. | |
| 2020/0393637 A1 | 12/2020 | Ryoo et al. | |
| 2021/0051247 A1 | 2/2021 | Lai | |

FOREIGN PATENT DOCUMENTS

| | | |
|---|---|---|
| CN | 204255775 U | 4/2015 |
| CN | 207782990 U | 8/2018 |
| CN | 108088359 B | 7/2019 |
| CN | 110788834 A | 2/2020 |
| CN | 110138266 B | 4/2020 |
| CN | 110957941 A | 4/2020 |
| CN | 111049421 A | 4/2020 |
| CN | 109347363 B | 5/2020 |
| CN | 109546887 B | 8/2020 |
| JP | 2003032537 A | 1/2003 |
| JP | 2008020813 A | 1/2008 |
| JP | 4585259 B2 | 11/2010 |
| JP | 4816026 B2 | 11/2011 |

\* cited by examiner

FLEXURE AMPLIFIED PIEZO ACTUATOR FOR FOCUS ADJUSTMENT

CROSS-REFERENCE TO RELATED APPLICATIONS

The present application is a continuation of U.S. patent application Ser. No. 17/658,041, filed Apr. 5, 2022; which itself is a continuation of U.S. patent application Ser. No. 17/132,667, filed Dec. 23, 2020 and issued as U.S. Pat. No. 11,323,599 on May 3, 2022; the contents of each of which are hereby incorporated by reference in their entireties.

Autonomous vehicles or vehicles operating in an autonomous mode may be equipped with one or more sensors configured to detect information about an environment in which the vehicle operates. As a non-limiting example, high-resolution cameras may be used to capture high-resolution images of the environment surrounding an autonomous vehicle. The high-resolution images are typically processed to identify objects and conditions external to the autonomous vehicle, and operation of the autonomous vehicle can be adjusted based on the identified objects and conditions depicted in the high-resolution images. As a non-limiting example, a command may be generated to stop the autonomous vehicle if the high-resolution images depict a stop sign.

Typically, an image sensor of a high-resolution camera is positioned within a threshold distance from a lens of the high-resolution camera to provide a range of image focus capability. However, the distance between the image sensor and the lens can fluctuate based on temperature. For example, the distance between the image sensor and the lens may expand in warmer temperatures, and the distance between the image sensor and the lens may contract in cooler temperatures. In some scenarios, the high-resolution camera can be subject to ambient temperatures ranging from −30° Celsius to 85° Celsius. This wide range of ambient temperatures can cause distance fluctuations between the image sensor and the lens, which in turn, can impact the image focus capability of the high-resolution camera.

SUMMARY

The present disclosure generally relates to a camera focus adjustment device formed from a piezoelectric actuator wedged into a flexure structure. According to the methods and techniques described herein, the camera focus adjustment device can be used to move an image sensor of a camera relative to a lens of the camera to provide a range of focus capability.

The flexure structure may include an outer framework of structural members that are interconnected using flexure notch hinges. The piezoelectric actuator (e.g., a piezoelectric stack) can be loaded between two inner structural members of the flexure structure using a pair of wedges. As a non-limiting example, the wedges can be loaded such that the piezoelectric material has a compressive stress pressure of approximately fifteen (15) Megapascals (MPa). The wedges are constructed (e.g., designed) such that wedges are affixed at an angle, such as an 85 degree angle, that holds the wedges in place.

Contraction of the piezoelectric material, based on an increased temperature, can cause displacement (e.g., expansion in the vertical direction) of the flexure structure. As a non-limiting example, if the piezoelectric material is exposed to a relatively warm environment, the piezoelectric material may contract. Contraction of the piezoelectric material may cause the flexure notch hinges of the flexure structure to displace (e.g., raise) the flexure structure. Thus, if the image sensor of the camera is coupled to the flexure structure, the image sensor can be raised by the flexure structure in response to exposure of the piezoelectric material to the relatively warm environment. Raising the image sensor can substantially offset any distance fluctuations between the image sensor and the lens due to exposure to the relatively warm environment.

In a first aspect, a camera focus adjustment device includes a flexure structure, a pair of wedges, and a piezoelectric material. The flexure structure includes a plurality of structural members continuously interconnected by flexure notch hinges. The plurality of structural members includes a first horizontal structural member affixed to an image sensor of a camera and a second horizontal structural member oriented in parallel to the first horizontal structural member. The second horizontal structural member is rigidly affixed to a surface. The plurality of structural members also includes a first vertical structural member oriented perpendicularly to the first horizontal structural member and a second vertical structural member oriented perpendicularly to first horizontal structural member. The plurality of structural members further includes a third horizontal structural member extending from the first vertical structural member and oriented in parallel to the first horizontal structural member. The plurality of structural members also includes a fourth horizontal structural member extending from the second vertical structural member and oriented in parallel to the first horizontal structural member. The plurality of structural members also includes a first upper structural member connected to the first horizontal structural member and to the first vertical structural member. The plurality of structural members also includes a second upper structural member connected to the first horizontal structural member and to the second vertical structural member. The plurality of structural members also includes a first lower structural member connected to the second horizontal structural member and to the first vertical structural member. The plurality of structural members also includes a second lower structural member connected to the second horizontal structural member and to the second vertical structural member. The pair of wedges is affixed to the third horizontal structural member, and the piezoelectric material is affixed to the pair of wedges and to the fourth horizontal structural member. Expansion and contraction of the piezoelectric material causes the flexure notch hinges to displace the flexure structure.

In a second aspect, a camera includes a camera focus adjustment device, a lens, and an image sensor coupled to the camera focus adjustment device. The image sensor is located between the camera focus adjustment device and the lens. The camera focus adjustment device includes a flexure structure. The flexure structure includes an outer framework of structural members continuously interconnected by flexure notch hinges. The flexure structure also includes two inner structural members oriented in parallel and extending from the outer framework of structural members. A gap is between the two inner structural members. The camera focus adjustment device also includes a piezoelectric material within the gap and a pair of wedges within the gap. The pair of wedges is affixed to the piezoelectric material and to one inner structural member of the two inner structural members. Based on temperature-based piezoelectric activity associated with the piezoelectric material, the camera focus adjustment device is operable to move the image sensor relative to the lens.

In a third aspect, a method of loading a camera focus adjustment device includes inserting piezoelectric material in a gap between two inner structural members of a flexure structure of the camera focus adjustment device. The flexure structure includes an outer framework of structural members continuously interconnected by flexure notch hinges and the two inner structural members. The two inner structural members oriented in parallel and extending from the outer framework of structural members. The method also includes applying a compressive stress pressure to the piezoelectric material by loading a first wedge between a first inner structural member of the two inner structural members and the piezoelectric material. The method further includes applying additional compressive stress pressure to the piezoelectric material by loading a second wedge between the first inner structural member and the first wedge. The first wedge and the second wedge are affixed at an 85 degree angle.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

The present disclosure generally relates to a camera focus adjustment device formed from a piezoelectric material wedged into a flexure structure. According to the methods and techniques described herein, the camera focus adjustment device can be used to move an image sensor of a camera (attached to an autonomous vehicle) relative to a lens of the camera to provide a range of focus capability.

The flexure structure as described herein includes structural members that are interconnected using flexure notch hinges. For example, an outer framework of the flexure structure includes two horizontal structural members (e.g., a top and bottom horizontal structural member) oriented in parallel and two vertical structural members (e.g., a left and right vertical structural member) oriented perpendicularly to the horizontal structural members. To complete the outer framework of the flexure structure, the top horizontal structural member is connected to the vertical structural members using a pair of corresponding upper structural members, and the bottom horizontal structural member is connected to the vertical structural members using a pair of corresponding lower structural members. Thus, the outer framework of the flexure structure can include eight structural members that are interconnected using flexure notch hinges.

The piezoelectric material (e.g., a piezoelectric stack or a piezoelectric actuator) can be loaded between two inner structural members of the flexure structure. For example, a first inner structural member extends from the left vertical structural member and is oriented in parallel to the horizontal structural members, and a second inner structural member extends from the right vertical structural member and is oriented in parallel to the horizontal structural members. The piezoelectric material may be placed in a gap between the two inner structural members in a zero stress state. After placing the piezoelectric material in the gap, a first wedge and a second wedge are loaded between the first inner structural member and the piezoelectric material to add a compressive stress pressure to the piezoelectric material. As a non-limiting example, the wedges can be loaded such that the piezoelectric material has a compressive stress pressure of approximately fifteen (15) Megapascal (MPa). The wedges are constructed (e.g., designed) such that wedges are affixed at an angle, such as an 85 degree angle, that holds the wedges in place.

Contraction of the piezoelectric material, based on an increased temperature, can cause displacement (e.g., expansion in the vertical direction) of the flexure structure. As a non-limiting example, if the piezoelectric material is exposed to a relatively warm environment, the piezoelectric material may contract by a particular distance, such as by approximately 15 micrometers (μm). Contraction of the piezoelectric material may cause the flexure notch hinges of the flexure structure to displace (e.g., raise) the flexure structure in such a manner that the top horizontal structural member is raised by 105 μm (e.g., approximately seven times the contraction distance of the piezoelectric material).

Thus, if the image sensor of the camera is coupled to the top horizontal structural member, the image sensor can be raised by the flexure structure in response to exposure of the piezoelectric material to the relatively warm environment. Raising the image sensor can substantially offset any distance fluctuations between the image sensor and the lens due to exposure to the relatively warm environment. As a non-limiting example, if the distance between the image sensor and the lens expands by approximately 105 µm due to an increase in environmental temperature, the expansion can be offset by flexure structure raising the image sensor by 105 µm.

Conversely, expansion of the piezoelectric material, based on a decreased temperature, can cause displacement (e.g., contraction in the vertical direction) of the flexure structure. As a non-limiting example, if the piezoelectric material is exposed to a relatively cool environment, the piezoelectric material may expand by a particular distance, such as by approximately 15 µm. Expansion of the piezoelectric material may cause the flexure notch hinges of the flexure structure to displace (e.g., lower) the flexure structure in such a manner that the top horizontal structural member is lowered by 105 µm (e.g., approximately seven times the expansion distance of the piezoelectric material). Thus, if the image sensor of the camera is coupled to the top horizontal structural member, the image sensor can be lowered by the flexure structure in response to exposure of the piezoelectric material to the relatively cool environment. Lowering the image sensor can substantially offset any distance changes between the image sensor and the lens due to exposure to the relatively cool environment. As a non-limiting example, if the distance between the image sensor and the lens is shortened by approximately 105 µm due to a decrease in environmental temperature, the shortened distance can be offset by flexure structure lowering the image sensor by 105 µm.

Thus, the camera focus adjustment device can move the image sensor to compensate for temperature-based distance fluctuations between the image sensor and the lens. As a result, the camera can experience a relatively large range of focus capability. It should be appreciated that the piezoelectric material may also contract or expand in response to an input voltage, such as a 100 volt (V) signal.

II. EXAMPLE EMBODIMENTS

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, the multiple flexure notch hinges are illustrated and associated with reference numbers 150A, 150B, 150C, etc. When referring to a particular one of the flexure notch hinges, such as the flexure notch hinge 150A, the distinguishing letter "A" is used. However, when referring to any arbitrary one of these flexure notch hinges or to these flexure notch hinges as a group, the reference number 150 is used without a distinguishing letter.

Figure 1:
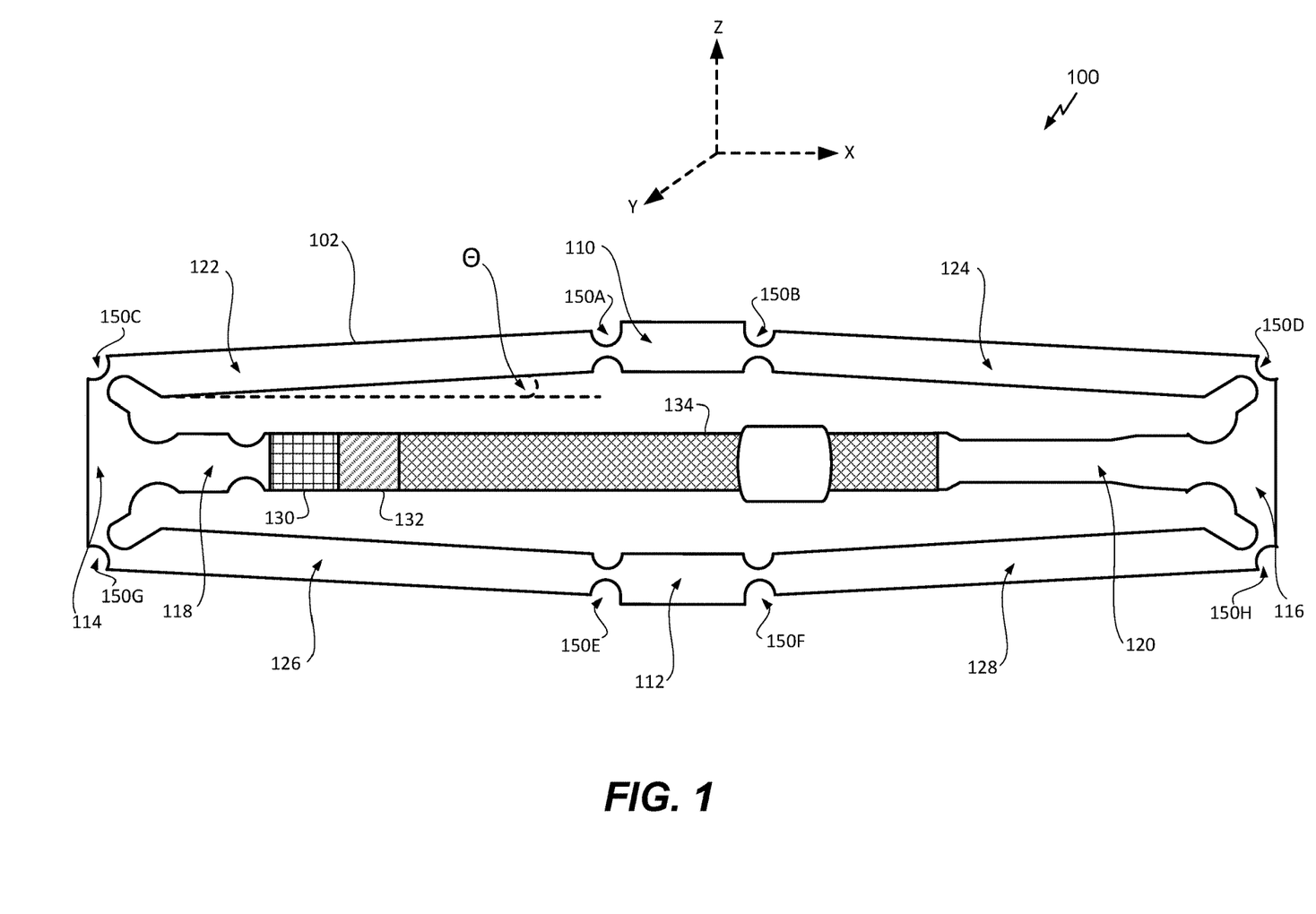
FIG. 1 is a cross-sectional diagram of a camera focus adjustment device, in accordance with an example embodiment.

FIG. 1 is a cross-sectional diagram of a camera focus adjustment device 100, in accordance with an example embodiment. As described in greater detail with respect to FIG. 6, the camera focus adjustment device 100 is operable to reposition (e.g., move in the z-direction) an image sensor of a camera with respect to a lens of the camera to improve an image focus capability of the camera. As a non-limiting example, the camera focus adjustment device 100 is operable to move the image sensor in such a manner to ensure that the distance between the image sensor and the lens is within a threshold distance (e.g., ten (10) micrometers (µm)) over a relatively large temperature range. Keeping the image sensor and the lens within the threshold distance may ensure the camera has relatively high focus capabilities.

The camera focus adjustment device 100 includes a flexure structure 102. The flexure structure 102 includes a plurality of structural members continuously interconnected by flexure notch hinges 150A-150H. The flexure notch hinges 150 can be manufactured using a conventional machining process as opposed to an electrical discharge machining (EDM) process to improve a cost of manufacturing. As illustrated in FIG. 1, the plurality of structural members includes a first horizontal structural member 110, a second horizontal structural member 112, a first vertical structural member 114, a second vertical structural member 116, a third horizontal structural member 118, a fourth horizontal structural member 120, a first upper structural member 122, a second upper structural member 124, a first lower structural member 126, and a second lower structural member 128. The structural members 110, 112, 114, 116, 122, 124, 126, 128 form an outer framework of the flexure structure 102, and the structural members 118, 120 are inner structural members of the flexure structure 102.

As shown in FIG. 1, the second horizontal structural member 112 (e.g., the bottom horizontal structural member) is oriented in parallel to the first horizontal structural member 110 (e.g., the top horizontal structural member). The first vertical structural member 114 (e.g., the left vertical structural member) is oriented perpendicularly to the horizontal structural members 110, 112, and the second vertical structural member 116 (e.g., the right vertical structural member) is oriented perpendicularly to the horizontal structural members 110, 112. The first upper structural member 122 is connected to the first horizontal structural member 110 via a flexure notch hinge 150A, and the first upper structural member 122 is connected to the first vertical structural member 114 via a flexure notch hinge 150C. The second upper structural member 124 is connected to the first horizontal structural member 110 via a flexure notch hinge 150B, and the second upper structural member 124 is connected to the second vertical structural member 116 via a flexure notch hinge 150D. The first lower structural member 126 is connected to the second horizontal structural member 112 via a flexure notch hinge 150E, and the first lower structural member 126 is connected to the first vertical structural member 114 via a flexure notch hinge 114. The second lower structural member 128 is connected to the second horizontal structural member 112 via a flexure notch hinge 150F, and the second lower structural member 128 is connected to the second vertical structural member 114 via a flexure notch hinge 150H. As illustrated in FIG. 1, the structural members 110, 112, 114, 116, 122, 124, 126, 128 form an outer framework of the flexure structure 102.

The third horizontal structural member 118 extends from the first vertical structural member 114 and is oriented in parallel to the first horizontal structural member 110. The fourth horizontal structural member 120 extends from the second vertical structural member 116 and is oriented in parallel to the first horizontal structural member 110. A gap between the third horizontal structural member 118 and the fourth horizontal structural member 120 is used to load a piezoelectric material 134 (e.g., a piezo stack or a piezoelectric actuator) using a pair of wedges 130, 132. The gap is shown in greater detail with respect to the three-dimensional illustration of the flexure structure 102 in FIG. 2.

The piezoelectric material 134 is placed in the gap in a zero stress state. After placing the piezoelectric material 134 in the gap, the pair of wedges 130, 132 is loaded between the third horizontal structural member 118 and the piezoelectric material 134 to add a compressive stress pressure to the piezoelectric material 134. As a non-limiting example, the wedges 130, 132 can be loaded such that the piezoelectric material 134 has a compressive stress pressure of approximately fifteen (15) Megapascals (MPa).

According to some implementations, the flexure structure 102 is comprised of a high carbon martensitic stainless steel, such as a 440C stainless steel or a 440F stainless steel. In some scenarios, the material of the flexure structure 102 is selected to reduce a difference between a coefficient of thermal expansion (CTE) of the flexure structure 102 and a CTE of the piezoelectric material 134. As a non-limiting example, if 440F stainless steel is selected for the flexure structure 102, the CTE in the x-direction for the flexure structure 102 may be approximately ten (10) parts per million (ppm) and the CTE for the piezoelectric material 134 along the actuation axis may be approximately negative five (−5) ppm due to the pyroelectric effect. The CTE in the z-direction for the flexure structure 102 may be substantially less than the CTE in the x-direction because, as described below, expansion of the flexure structure 102 x-direction causes the contraction of the flexure structure 102 in the z-direction.

The dimensions of the camera focus adjustment device 100 can vary based on implementation. According to one implementation, the length of the flexure structure 102 is approximately forty (40) millimeters (mm), the height of the flexure structure 102 is approximately ten (10) mm, and the width of the flexure structure is approximately five (5) mm. According to one implementation, the length of the piezoelectric material 134 is approximately eighteen (18) mm, the height of the piezoelectric material 134 is approximately three (3) mm, and the width of the piezoelectric material 134 is approximately two (2) mm. It should be understood that these dimensions are merely illustrative and should not be construed as limiting.

If the flexure structure 102 is in a zero stress state, as illustrated in FIG. 1, the upper structural members 122, 124 and the lower structural members 126, 128 may be oriented along a similar absolute angle with respect to the x-direction (e.g., the directional orientation of the horizontal structural members 110, 112). According to one example, the flexure notch hinges 150 may be designed such that the upper structural members 122, 124 and the lower structural members 126, 128 are oriented along an absolute angle of three (3) degrees with respect to the x-direction. In this embodiment, the orientation angle (θ) of the first upper structural member 122 with respect to the x-direction is approximately three (3) degrees. In this scenario, the absolute orientation angles of the second upper structural member 124 and the lower structural members 126, 128 may be substantially similar.

During operation, contraction of the piezoelectric material 134, based on an increased temperature, can cause displacement (e.g., expansion in the z-direction) of the flexure structure 102. As a non-limiting example, if the piezoelectric material 134 is exposed to a relatively warm environment, the piezoelectric material 134 may contract by a particular distance in the x-direction, such as by approximately 15 micrometers (μm). Contraction of the piezoelectric material 134 may cause the flexure notch hinges 150 of the flexure structure 102 to displace (e.g., raise) the flexure structure 102 in such a manner that the first horizontal structural member 110 is raised by 105 μm (e.g., approximately seven times the contraction distance of the piezoelectric material 134). Thus, if an image sensor of a camera is coupled to the first horizontal structural member 110, as described below with respect to FIG. 6, the image sensor can be raised (in the z-direction) by the flexure structure 102 in response to exposure of the piezoelectric material 134 to the relatively warm environment. Raising the image sensor can substantially offset any distance changes between the image sensor and a lens due to exposure to the relatively warm environment. As a non-limiting example, if the distance between the image sensor and the lens expands by approximately 105 μm due to an increase in environmental temperature, the expansion can be offset by flexure structure 102 raising the image sensor by 105 μm.

Expansion of the piezoelectric material 134, based on a decreased temperature, can cause displacement (e.g., contraction in the z-direction) of the flexure structure 102. As a non-limiting example, if the piezoelectric material 134 is exposed to a relatively cool environment, the piezoelectric material 134 may expand by a particular distance x-direction, such as by approximately 15 μm. Expansion of the piezoelectric material 134 may cause the flexure notch hinges 150 of the flexure structure 102 to displace (e.g., lower) the flexure structure 102 in such a manner that the first horizontal structural member 110 is lowered by 105 μm (e.g., approximately seven times the expansion distance of the piezoelectric material 134). Thus, if the image sensor of the camera is coupled to the first horizontal structural member 110, the image sensor can be lowered by the flexure structure 102 in response to exposure of the piezoelectric material 134 to the relatively cool environment. Lowering the image sensor can substantially offset any distance changes between the image sensor and the lens due to exposure to the relatively cool environment. As a non-limiting example, if the distance between the image sensor and the lens is shortened by approximately 105 μm due to a decrease in environmental temperature, the shortened distance can be offset by flexure structure 102 lowering the image sensor by 105 μm.

Thus, the camera focus adjustment device 100 can move the image sensor to compensate for temperature-based distance fluctuations between the image sensor and the lens. As a result, the camera can experience a relatively large range of focus capability.

It should be appreciated that the flexure structure 102 experiences a substantial expansion in the z-direction based on a relatively small of amount of piezoelectric material 134 contraction in the x-direction. For example, the flexure structure 102 can be designed to amplify the motion of the piezoelectric material 134 by at least a factor of seven. Because the flexure structure 102 is designed to produce a relatively pure translation in the z-direction, it should be appreciated that translation and rotation in the x-direction and the y-direction is substantially reduced, which improves camera focus capabilities.

FIGS. 2-5 illustrate a process for manufacturing the camera focus adjustment device 100 of FIG. 1. In particular, the process for loading the piezoelectric material 134 into the flexure structure 102 is described with respect to FIGS. 2-5.

Figure 2:
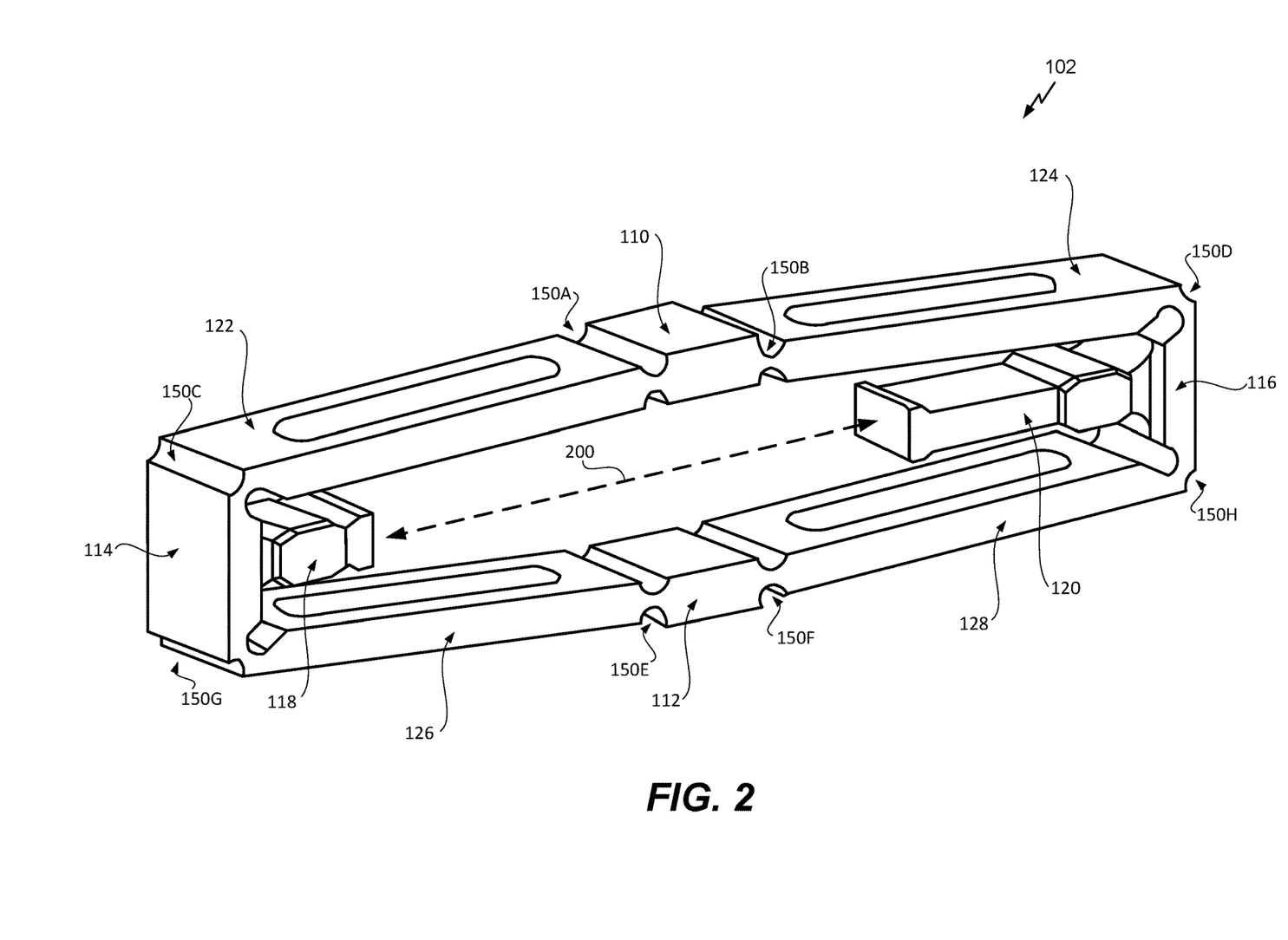
FIG. 2 is a three-dimensional diagram of a flexure structure of the camera focus adjustment device, in accordance with an example embodiment.

FIG. 2 is a three-dimensional diagram of the flexure structure 102, in accordance with an example embodiment. The flexure structure 102 includes the outer framework comprised of the structural members 110, 112, 114, 116, 122, 124, 126, 128. The flexure structure 102 also includes the horizontal structural members 118, 120 extending from the vertical structural members 114, 116, respectively. As illustrated in FIG. 2, the flexure structure 102 includes a gap 200 between the horizontal structural members 118, 120. The gap 200 is used to load the piezoelectric material 134 using the pair of wedges 130, 132, as described with respect to FIGS. 3-5.

Figure 3:
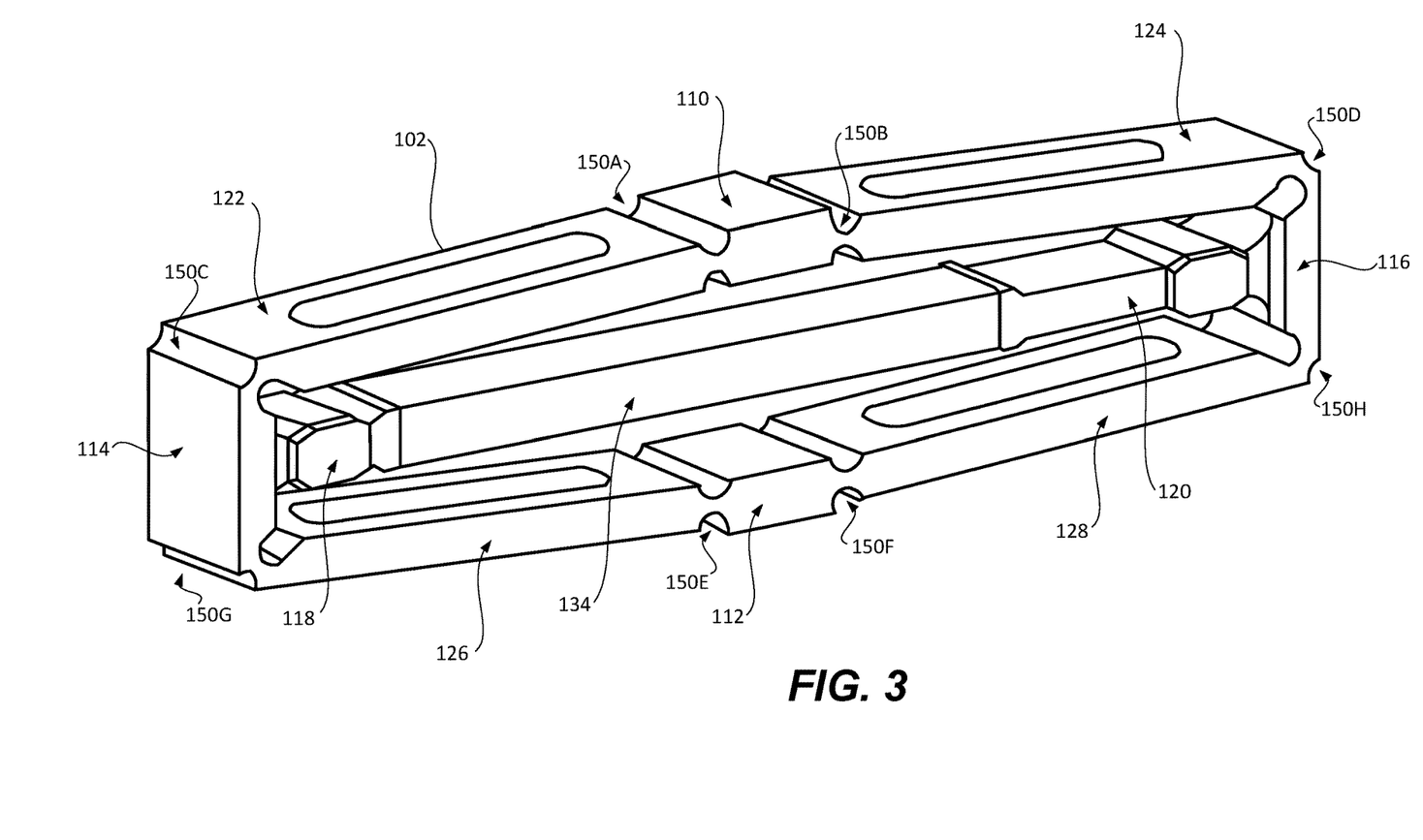
FIG. 3 is a three-dimensional diagram of the flexure structure with a piezoelectric material, in accordance with an example embodiment.

FIG. 3 is a three-dimensional diagram of the flexure structure 102 with the piezoelectric material 134, in accordance with an example embodiment. For example, as illustrated in FIG. 3, the piezoelectric material 134 is placed in the gap 200 in a zero stress state. That is, the piezoelectric material 134 is positioned between the horizontal structural members 118, 120 with little to approximately no stress applied to the piezoelectric material 134.

Figure 4:
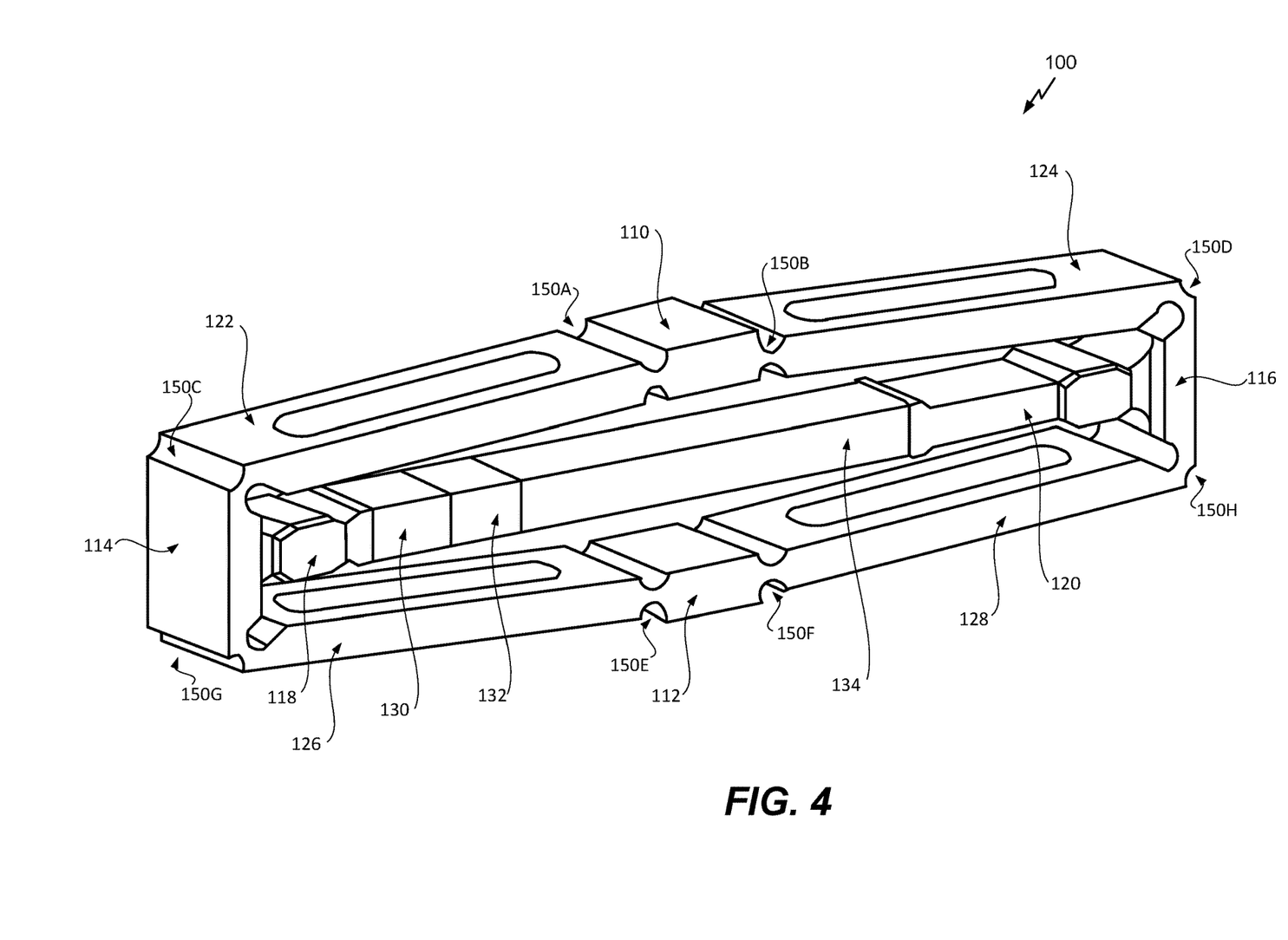
FIG. 4 is a three-dimensional diagram of the camera focus adjustment device, in accordance with an example embodiment.

FIG. 4 is a three-dimensional diagram of the camera focus adjustment device 100, in accordance with an example embodiment. For example, as illustrated in FIG. 4, the wedge 130 and the wedge 132 are loaded between the third horizontal structural member 118 and the piezoelectric material 134 to add the compressive stress pressure to the piezoelectric material 134.

Figure 5:
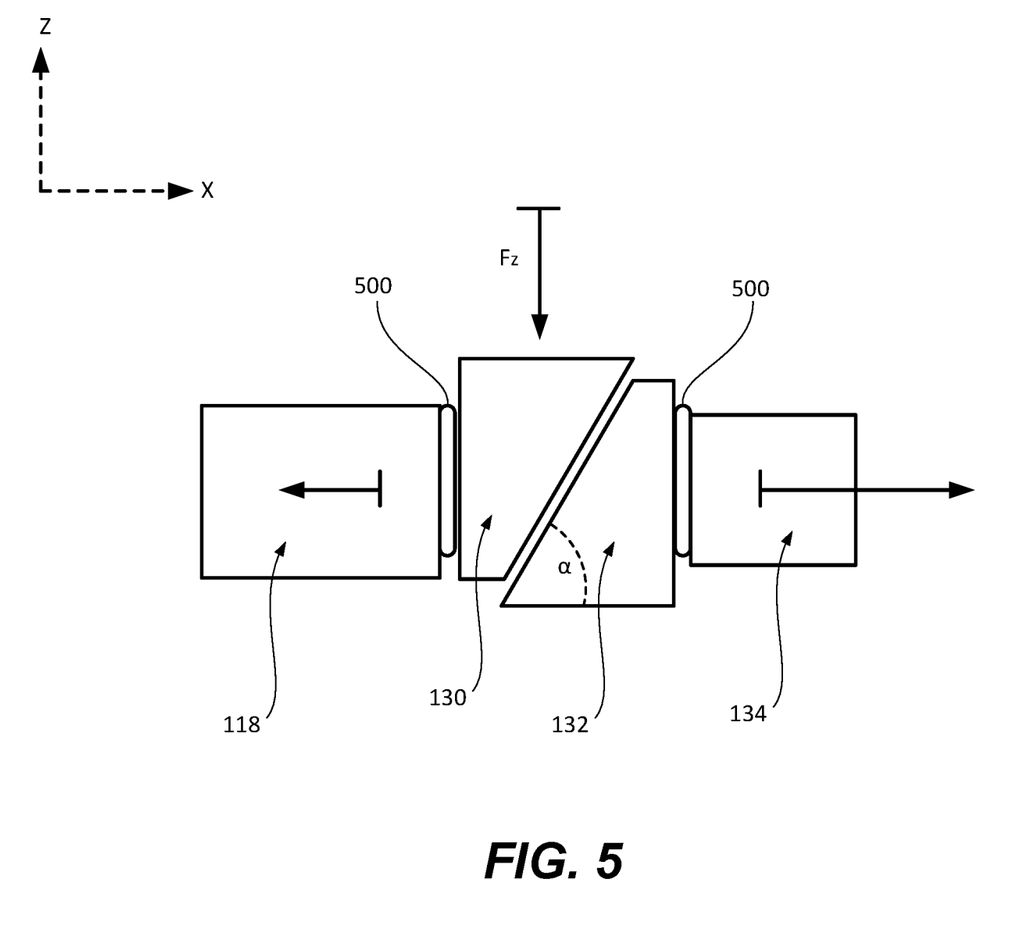
FIG. 5 is a diagram illustrating the process of loading the piezoelectric material with wedges, in accordance with an example embodiment.

FIG. 5 is a diagram illustrating the process of loading the piezoelectric material 134 with the wedges 130, 132, in accordance with an example embodiment. For example, FIG. 5 illustrates the third horizontal structural member 118, the wedge 130, the wedge 132, and the piezoelectric material 134.

As illustrated in FIG. 5, the wedge 130 is coupled (e.g., affixed) to the wedge 132 at a particular angle (α). According to one implementation, the wedges 130, 132 are designed such that the particular angle (α) is equal to 85 degrees. In some non-limiting scenarios, the particular angle (α) can range from 84.5 degrees to 85.5 degrees. It should be understood that in different implementations, the range of the particular angle (α) may vary. It should also be understood that in some implementations, the wedges 130, 132 may be coupled at a 90 degree angle and held in place via an adhesive. However, coupling or affixing the wedges 130, 132 at the particular angle (α) may ensure that friction holds the wedges 130, 132 in place when a force, such as a particular load force (Fz), is removed.

As illustrated in FIG. 5, the wedge 132 is positioned (e.g., wedged) between the third horizontal structural member 118 and the piezoelectric material 134. After the wedge 132 is positioned, the wedge 130 is positioned (e.g., wedged) between the wedge 132 and the third horizontal structural member 118 using a particular load force (Fz). According to one implementation, the particular load force (Fz) can be 26 Newtons (N) applied to the wedge 130 along the z-direction to load the piezoelectric material 134 with a compressive stress pressure of approximately 15 MPa. That is, the particular load force (Fz) of 26 N can create an axial force of 90 N in the x-direction using the 85 degree wedges 130, 132 to load (e.g., pre-load) the piezoelectric material 134 with the compressive stress pressure of approximately 15 MPa. Pre-loading the piezoelectric material 134 with the wedges 130, 132 may cause the flexure structure 102 to contract by approximately 75 μm in the z-direction and may cause the piezoelectric material 134 to contract by approximately 6 μm in the x-direction.

By pre-loading the piezoelectric material 134 with the wedges 130, 132, an external pre-load spring may be unnecessary. Once the piezoelectric material 134 is loaded and the particular load force (Fz) is removed, it will be appreciated that friction may hold the wedges 130, 132 in place. Thus, the friction between the wedges 130, 132 is used to maintain the compressive stress pressure of the piezoelectric material 134. However, in certain implementations, an adhesive 500 (e.g., an ultraviolet-curable adhesive) may be used between the flexure structure 102, the wedges 130, 132, and the piezoelectric material 134.

Figure 6:
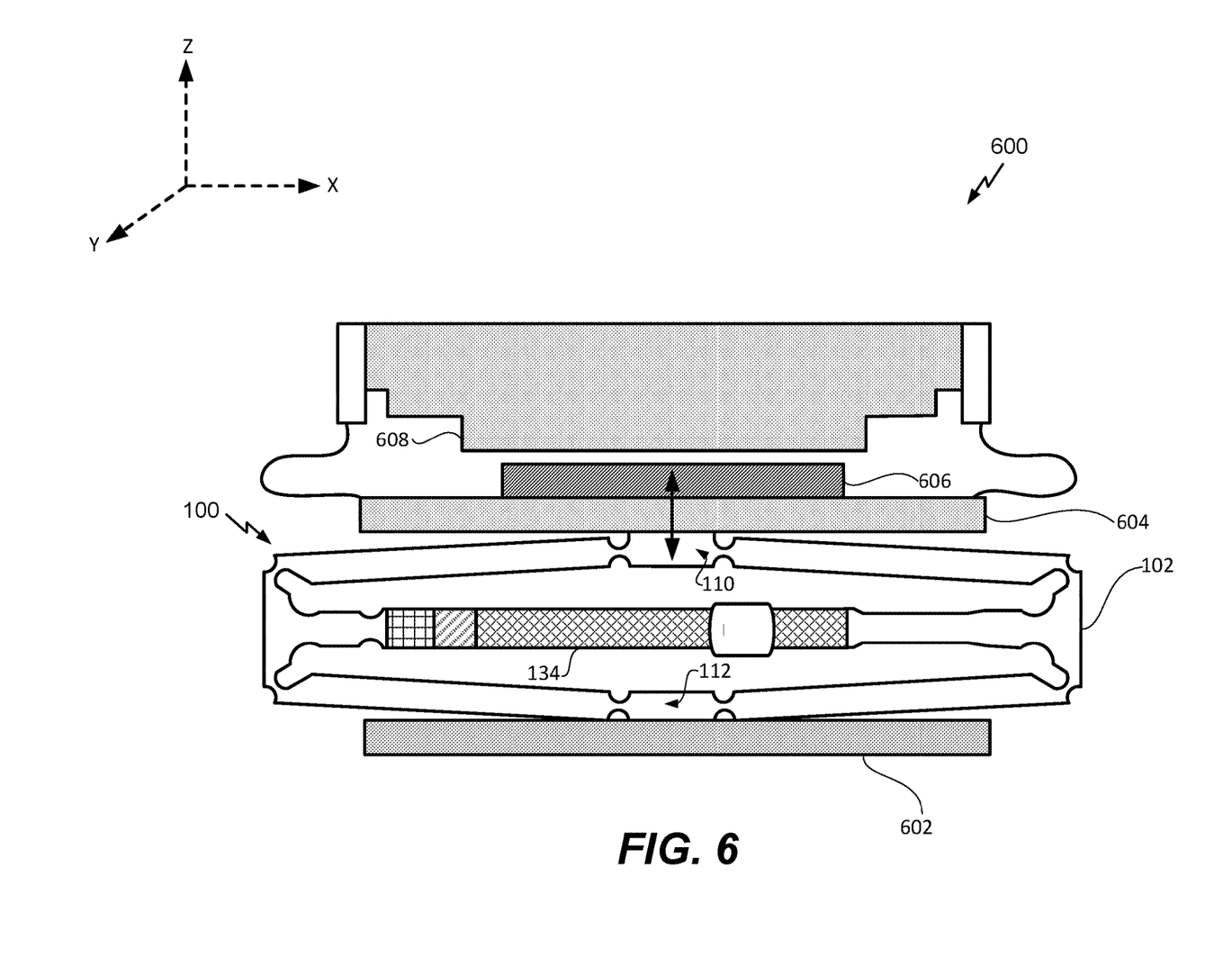
FIG. 6 is a diagram of a camera that includes the camera focus adjustment device, in accordance with an example embodiment.

FIG. 6 is a diagram of a camera 600 that includes the camera focus adjustment device 100, in accordance with an example embodiment. As shown in FIG. 6, the camera 600 includes a fixed surface 602, the camera focus adjustment device 100, an image sensor board 604, an image sensor 606, and a lens 608. It should be understood that the camera 600 can include other components that are not illustrated in FIG. 6. As non-limiting examples, the camera 600 can also include a lens mount, a flash, a shutter, a mirror, a filter, etc.

The second horizontal structural member 112 of the camera focus adjustment device 100 can be rigidly affixed to the fixed surface 602. Rigidly affixing the second horizontal structural member 112 to the fixed surface 602 may prevent movement of the second horizontal structural member 112 when the piezoelectric material 134 expands or contracts. That is, the camera focus adjustment device 100 can collapse to the second horizontal structural member 112 or raise from the second horizontal structural member 112, but the position of the second horizontal structural member 112 is fixed.

As illustrated in FIG. 6, the first horizontal structural member 110 of the camera focus adjustment device 100 can be affixed (e.g., coupled) to the image sensor board 604, and the image sensor 606 is coupled to the image sensor board 604. According to one implementation, the image sensor 606 is positioned within a threshold distance from the lens 608 of the camera 600 to provide the camera 600 a range of image focus capability. As a non-limiting example, the image sensor 606 can be positioned within ten (10) micrometers (μm) of the lens 608 to provide the camera 600 a range of image focus capability.

However, in some scenarios, the distance between the image sensor 606 and the lens 608 can fluctuate based on temperature. For example, the distance between the image sensor 606 and the lens 608 may expand in warmer temperatures, and the distance between the image sensor 606 and the lens 608 may contract in cooler temperatures.

To adjust for distance fluctuations between the image sensor 606 and the lens 608, the camera focus adjustment device 100 is operable to vertically translate (e.g., translate in the z-direction) based on temperature-based piezoelectric activity associated with piezoelectric material 134. For example, contraction of the piezoelectric material 134 in warm environments can cause the flexure notch hinges 150 of the camera focus adjustment device 100 to displace (e.g., raise) the camera focus adjustment device 100 in the z-direction. To illustrate, when the piezoelectric material 134 contracts in the x-direction, the flexure notch hinges 150 raise the camera focus adjustment device 100. As a result, the image sensor board 604 coupled to the first horizontal structural member 110, and thus the image sensor 606, is raised such that the image sensor 606 is vertically translated (in the z-direction) to be closer to the lens 608. Thus, in warmer temperatures where the distance between the image sensor 606 and the lens 608 expands to a point whereby the focus capability of the camera 600 is potentially compromised, the camera focus adjustment device 100 can raise the image sensor 606 closer to the lens 608 to improve the focus capability of the camera 600.

Alternatively, expansion of the piezoelectric material 134 in cool environments can cause the flexure notch hinges 150 of the camera focus adjustment device 100 to displace (e.g., lower) the camera focus adjustment device 100 in the z-direction. To illustrate, when the piezoelectric material 134 expands in the x-direction, the flexure notch hinges 150 lower the camera focus adjustment device 100. As a result, the image sensor board 604 coupled to the first horizontal structural member 110, and thus the image sensor 606, is lowered such that the image sensor 606 is vertically translated (in the z-direction) to be further from the lens 608. Thus, in cooler temperatures where the distance between the image sensor 606 and the lens 608 contracts to a point whereby the focus capability of the camera 600 is potentially compromised, the camera focus adjustment device 100 can lower the image sensor 606 from the lens 608 to improve the focus capability of the camera 600.

Thus, the camera focus adjustment device 100 is operable to control the distance between the image sensor 606 and the lens 608 over a relatively large temperature range to ensure the camera 600 has relatively high focus capabilities. For example, the camera focus adjustment device 100 can move the image sensor 606 to compensate for fluctuations in the distance between the image sensor 606 and the lens 608 based on temperature.

The camera focus adjustment device 100 provides additional benefits to the camera 600. For example, because the camera focus adjustment device 100 does not include any sliding elements, such as bearing or lead screws, the camera 600 may not be subject to backlash or particle generation that is associated with sliding elements. Additionally, the camera focus adjustment device 100 can maintain or hold the image sensor 606 at a constant distance from the lens 608 without using power, which may result in increased power savings.

By moving the image sensor 606, the camera focus adjustment device 100 can adjust the distance between the image sensor 606 and the lens 608 while keeping the camera 600 sealed from external elements that the camera 600 may otherwise be exposed to if the lens 608 is moved. Additionally, the camera focus adjustment device 100 is subject to a reduced load compared to conventional devices that move the lens 608 because the lens 608 is heavier than the image sensor 606.

Figure 7:
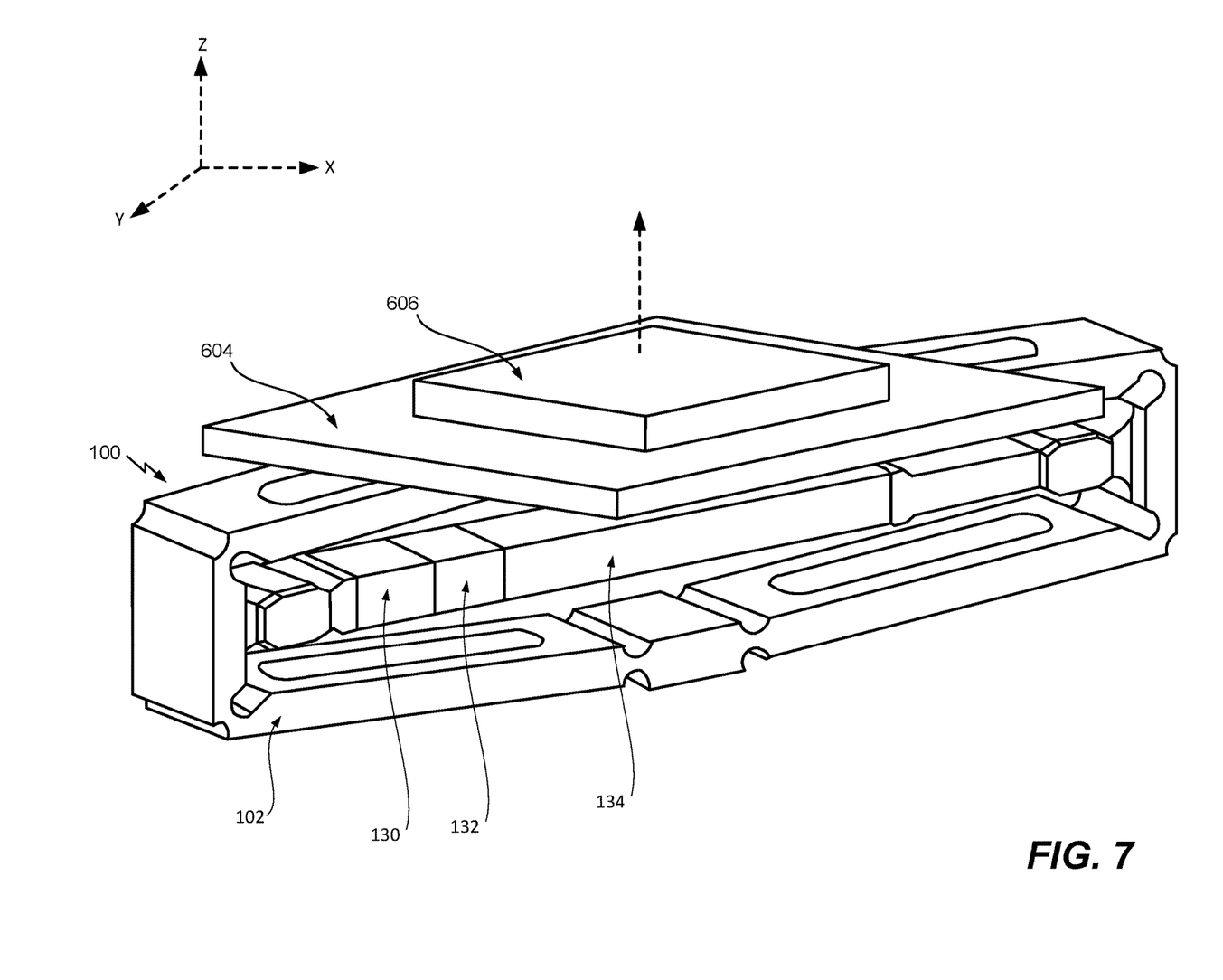
FIG. 7 is a three-dimensional diagram of the camera focus adjustment device coupled to an image sensor, in accordance with an example embodiment.

FIG. 7 is a three-dimensional diagram of the camera focus adjustment device 100 coupled to the image sensor 606 of the camera 606, in accordance with an example embodiment. As illustrated in FIG. 7, the image sensor board 604 is positioned on top of the camera focus adjustment device 100, and the image sensor 606 is coupled to the image sensor board 604. The camera focus adjustment device 100 is configured to raise the image sensor board 604, and thus the image sensor 606, in the z-direction in response to the piezoelectric material 134 contracting. For example, contraction of the piezoelectric material 134 may cause the flexure structure 102 to expand in the z-direction, which in turn, raises the image sensor 606.

Because the flexure structure 102 is designed to produce a relatively pure translation in the z-direction, it should be appreciated that flexure structure 102 reduces translation and rotation in the x-direction and the y-direction.

Figure 8:
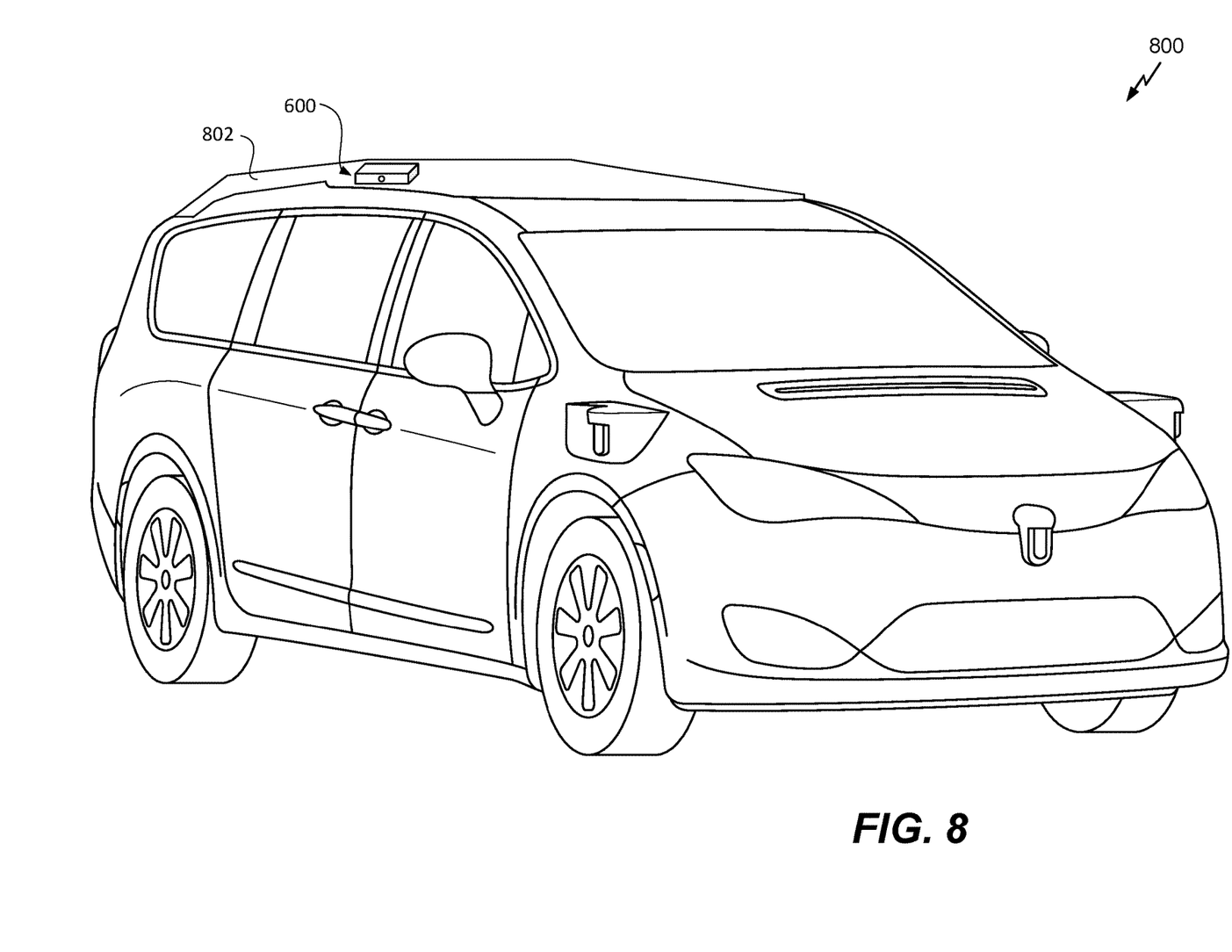
FIG. 8 is a diagram of an autonomous vehicle, in accordance with an example embodiment.

FIG. 8 is a diagram of an autonomous vehicle 800, in accordance with an example embodiment. Although the autonomous vehicle 800 is illustrated as a car, in other implementations, the autonomous vehicle 800 may take the form of a truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The autonomous vehicle 100 may be configured to operate fully or partially in an autonomous mode. For example, the autonomous vehicle 100 may control itself while in the autonomous mode, and may be operable to determine a current state of the autonomous vehicle 100 and its environment, determine a predicted behavior of at least one other vehicle in the environment, determine a confidence level that may correspond to a likelihood of the at least one other vehicle to perform the predicted behavior, and control the autonomous vehicle 100 based on the determined information. While in the autonomous mode, the autonomous vehicle 100 may be configured to operate without human interaction.

In FIG. 8, the camera 600 is coupled to a roof 802 of the autonomous vehicle 800. Although illustrated as coupled to the roof 802, in other implementations, the camera 600 can be coupled to other components of the autonomous vehicle 800. The camera 600 includes the components illustrated in FIG. 6, such as the fixed surface 602, the camera focus adjustment device 100, the image sensor board 604, the image sensor 606, and the lens 608. The camera 600 may be a high-resolution camera operable to capture high-resolution images of the environment surrounding the autonomous vehicle 800.

The flexure structure 102 of the camera focus adjustment device 100 can have a stiffness quality that passively rejects vibrations, such as automotive vibration of the autonomous vehicle 800. For example, the design and material of the flexure structure 102 may result in the flexure structure 102 remaining substantially steady despite external vibrations of surfaces coupled to the flexure structure 102. Thus, the flexure structure 102 experiences little to no movement based on external vibrations.

III. EXAMPLE METHODS

Figure 9:
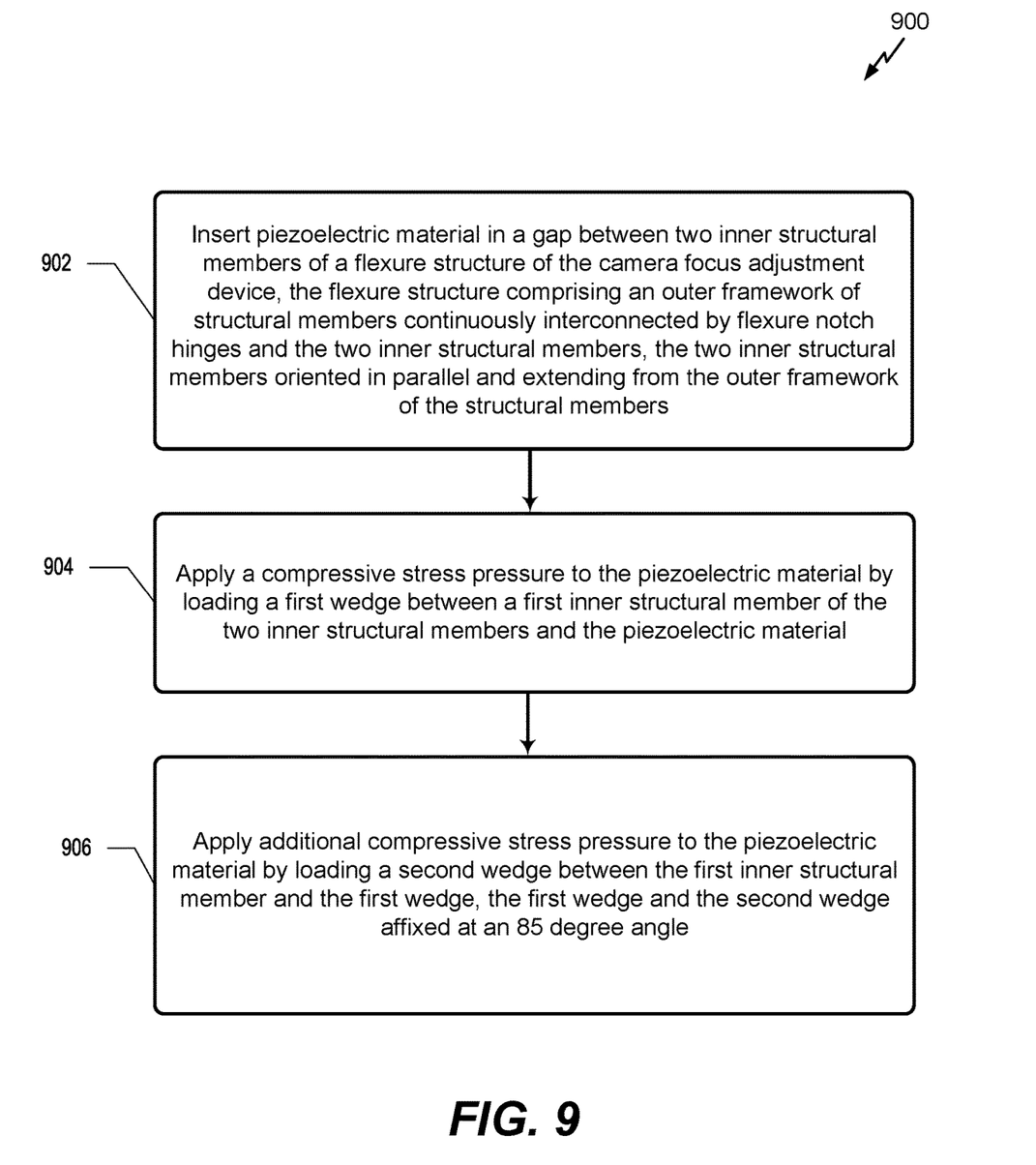
FIG. 9 is a flowchart of a method, according to an example embodiment.

FIG. 9 is a flowchart of a method 900, according to an example embodiment. The method 900 can be performed by manufacturing equipment.

The method 900 includes inserting piezoelectric material in a gap between two inner structural members of a flexure structure of a camera focus adjustment device, at 902. The flexure structure includes an outer framework of structural members continuously interconnected by flexure notch hinges and the two inner structural members. The two inner structural members are oriented in parallel and extending from the outer framework of the structural members. For example, referring to FIGS. 2-3, the piezoelectric material 134 is inserted, in a zero stress state, in the gap 200 between the horizontal structural members 118, 120. The flexure structure 112 includes the outer framework of structural members 110, 112, 114, 116, 122, 124, 126, 128 continuously interconnected by the flexure notch hinges 150. The flexure structure 102 also includes the two inner structural members 118, 120.

The method 900 also includes applying a compressive stress pressure to the piezoelectric material by loading a first wedge between a first inner structural member of the two inner structural members and the piezoelectric material, at 904. For example, referring to FIGS. 4-5, compressive stress pressure is applied to the piezoelectric material 134 by loading the wedge 132 between the structural member 118 and the piezoelectric material 134.

The method 900 further includes applying additional compressive stress pressure to the piezoelectric material by loading a second wedge between the first inner structural member and the first wedge, at 906. In some implementations, the first wedge and the second wedge are affixed at an angle to ensure friction holds the wedges in place when a force is removed. For example, referring to FIGS. 4-5, additional compressive stress pressure is applied to the piezoelectric material by loading the wedge 130 between the structural member 118 and the wedge 132. According to one non-limiting implementation, the wedges 130, 132 may be affixed at an 85 degree angle. However, it should be understood that the wedges 130, 132 may be affixed at different angles in other implementations. As illustrated in FIG. 5, according to one implementation, a particular load force (Fz) of 26 Newtons (N) can be applied to the wedge 130 along the z-direction to load the piezoelectric material 134 with a compressive stress pressure of approximately 15 MPa. That is, the particular load force (Fz) of 26 N can create an axial force of 90 N in the x-direction using the 85 degree wedges 130, 132 to load (e.g., pre-load) the piezoelectric material 134 with the compressive stress pressure of approximately 15 MPa. Pre-loading the piezoelectric material 134 with the wedges 130, 132 may cause the flexure structure 102 to contract by approximately 75 µm in the z-direction and may cause the piezoelectric material 134 to contract by approximately 6 µm in the x-direction.

By pre-loading the piezoelectric material 134 with the wedges 130, 132, the use of an external pre-load spring can be bypassed. Once the piezoelectric material 134 is loaded and the particular load force (Fz) is removed, it will be appreciated that friction may hold the wedges 130, 132 in place. Thus, the friction between the wedges 130, 132 is used to maintain the compressive stress pressure. However, in certain implementations, an adhesive 500 may be used between the flexure structure 102, the wedges 130, 132, and the piezoelectric material 134.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:
1. A camera focus adjustment device comprising:
 a flexure structure comprising two structural members oriented in parallel, wherein a gap exists between the two structural members;
 a piezoelectric material within the gap; and
 a pair of wedges within the gap, wherein the pair of wedges comprises a first wedge affixed to the piezoelectric material and a second wedge affixed to one of the structural members, wherein the piezoelectric material is configured to contract in response to an increase in environmental temperature or expand in response to a decrease in environmental temperature, and wherein the flexure structure is operable to counteract the contraction or expansion of the piezoelectric material.
2. The camera focus adjustment device of claim 1, wherein displacement of the flexure structure causes vertical displacement of an image sensor.
3. The camera focus adjustment device of claim 1, wherein the first wedge is affixed to the second wedge at an 85 degree angle.
4. The camera focus adjustment device of claim 1, wherein the piezoelectric material has a compressive stress pressure of approximately 15 Megapascals.
5. The camera focus adjustment device of claim 1, wherein the flexure structure is comprised of 440C stainless steel or 440F stainless steel.
6. The camera focus adjustment device of claim 1, wherein the flexure structure has a length of approximately 40 millimeters (mm), wherein the flexure structure has a height of approximately 10 mm, and wherein the flexure structure has a width of approximately 5 mm.
7. The camera focus adjustment device of claim 6, wherein the piezoelectric material has a length of approximately 18 mm, wherein the piezoelectric material has a height of approximately 3 mm, and wherein the piezoelectric material has a width of approximately 2 mm.
8. The camera focus adjustment device of claim 1, wherein a coefficient of thermal expansion (CTE) of the flexure structure is approximately 10 parts per million (ppm), and wherein a CTE of the piezoelectric material along an actuation axis is approximately −5 ppm.
9. The camera focus adjustment device of claim 1, wherein the second wedge is affixed to one of the structural members via an adhesive.
10. The camera focus adjustment device of claim 1, wherein the first wedge is affixed to the piezoelectric material via an adhesive.

11. An apparatus comprising:
a camera comprising:
a camera focus adjustment device comprising:
a flexure structure comprising two structural members oriented in parallel, wherein a gap exists between the two structural members;
a piezoelectric material within the gap; and
a pair of wedges within the gap, wherein the pair of wedges comprises a first wedge affixed to the piezoelectric material and a second wedge affixed to one of the structural members, wherein the piezoelectric material is configured to contract in response to an increase in environmental temperature or expand in response to a decrease in environmental temperature, and wherein the flexure structure is operable to counteract the contraction or expansion of the piezoelectric material;
a lens; and
an image sensor coupled to the camera focus adjustment device, the image sensor located between the camera focus adjustment device and the lens, wherein the camera focus adjustment device is operable to move the image sensor relative to the lens.

12. The apparatus of claim 11, wherein the camera is coupled to an autonomous vehicle.

13. The apparatus of claim 11, wherein the piezoelectric material is configured to contract in response to an increase in environmental temperature, and wherein the flexure structure is operable to counteract the contraction of the piezoelectric material such that the camera focus adjustment device moves the image sensor closer to the lens.

14. The apparatus of claim 11, wherein the piezoelectric material is configured to expand in response to a decrease in environmental temperature, and wherein the flexure structure is operable to counteract the expansion of the piezoelectric material such that the camera focus adjustment device moves the image sensor farther away from the lens.

15. The apparatus of claim 11, wherein the first wedge is affixed to the second wedge at an 85 degree angle.

16. The apparatus of claim 11, wherein the flexure structure is comprised of 440C stainless steel or 440F stainless steel.

17. The apparatus of claim 11, wherein the flexure structure is manufactured according to a machining process.

18. The apparatus of claim 11, wherein the camera focus adjustment device is operable to position the image sensor within 10 micrometers of the lens.

19. The apparatus of claim 11, wherein a coefficient of thermal expansion (CTE) of the flexure structure is approximately 10 parts per million (ppm), and wherein a CTE of the piezoelectric material along an actuation axis is approximately −5 ppm.

20. The apparatus of claim 11, wherein at least a portion of the flexure structure is oriented along a three degree angle with respect to an orientation of the structural members.

* * * * *